United States Patent
Matsui et al.

(10) Patent No.: US 12,519,896 B2
(45) Date of Patent: Jan. 6, 2026

(54) IMAGE READING DEVICE COMPRISING A LENS ARRAY INCLUDING FIRST LENS BODIES AND SECOND LENS BODIES, A LIGHT RECEIVER AND LIGHT BLOCKING PLATES THAT ARE BETWEEN THE LIGHT RECEIVER AND SECOND LENS BODIES, THE THICKNESS OF THE LIGHT BLOCKING PLATES EQUAL TO OR GREATER THAN THE SECOND LENS BODIES THICKNESS

(71) Applicant: Mitsubishi Electric Corporation, Tokyo (JP)

(72) Inventors: Hideki Matsui, Tokyo (JP); Daisuke Fukui, Tokyo (JP); Hiroyuki Kawano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 270 days.

(21) Appl. No.: 18/273,555

(22) PCT Filed: Dec. 9, 2021

(86) PCT No.: PCT/JP2021/045284
§ 371 (c)(1),
(2) Date: Jul. 21, 2023

(87) PCT Pub. No.: WO2022/163157
PCT Pub. Date: Aug. 4, 2022

(65) Prior Publication Data
US 2023/0412748 A1 Dec. 21, 2023

(30) Foreign Application Priority Data
Jan. 29, 2021 (JP) ................................. 2021-013159

(51) Int. Cl.
*H04N 1/03* (2006.01)
*G02B 5/00* (2006.01)
*G02B 3/00* (2006.01)

(52) U.S. Cl.
CPC .......... *H04N 1/0306* (2013.01); *G02B 5/003* (2013.01)

(58) Field of Classification Search
CPC ............. H04N 1/0306; H04N 1/00997; H04N 1/0282; H04N 1/02895; G02B 3/0056;
(Continued)

(56) References Cited

U.S. PATENT DOCUMENTS

| 4,432,022 A | 2/1984 | Tokumitsu |
| 5,661,540 A | 8/1997 | Kaihotsu et al. |

(Continued)

FOREIGN PATENT DOCUMENTS

| JP | S56-161772 A | 12/1981 |
| JP | H06-342131 A | 12/1994 |

(Continued)

OTHER PUBLICATIONS

International Search Report and Written Opinion mailed on Feb. 8, 2022, received for PCT Application PCT/JP2021/045284, filed on Dec. 9, 2021, 9 pages including English Translation.
Notice of Reasons for Refusal mailed on Dec. 20, 2022, received for JP Application 2022-552662, 22 pages including English Translation.

*Primary Examiner* — Chad Dickerson
(74) *Attorney, Agent, or Firm* — XSENSUS LLP

(57) ABSTRACT

An image reading device (100) includes a lens array (4), a light receiver (6), and at least one light blocking member. The lens array (4) includes first lens bodies arranged in a line in a main scanning direction with predetermined spacing therebetween to converge light from a reading target. The light receiver (6) receives light converged by each first lens body. The at least one light blocking member is disposed (Continued)

between the light receiver (6) and an end of the lens array (4) proximate to the reading target at at least one position corresponding to the predetermined spacing in the main scanning direction. The at least one light blocking member blocks light from the reading target propagating between the first lens bodies, and each of the at least one light blocking member separates optical paths of light converged by ones of the first lens bodies adjacent to each other.

6 Claims, 14 Drawing Sheets

(58) Field of Classification Search
CPC .... G02B 3/0062; G02B 5/003; G02B 3/0037; G02B 5/00; G02B 3/005; G02B 5/005
USPC ................................. 358/474, 475, 494, 505
See application file for complete search history.

(56) References Cited

U.S. PATENT DOCUMENTS

| | | | |
|---|---|---|---|
| 2009/0323191 A1* | 12/2009 | Yamamura | G02B 3/005 359/619 |
| 2013/0038915 A1 | 2/2013 | Kusaka et al. | |
| 2020/0310004 A1* | 10/2020 | Hachisuga | H04N 1/0282 |
| 2022/0014641 A1* | 1/2022 | Yamagata | H04N 1/191 |
| 2024/0251049 A1* | 7/2024 | Matsui | H04N 1/0306 |
| 2025/0172801 A1* | 5/2025 | Sawabe | H04N 1/0289 |

FOREIGN PATENT DOCUMENTS

| | | |
|---|---|---|
| JP | H09-307697 A | 11/1997 |
| JP | 2010-286741 A | 12/2010 |
| JP | 2013-037298 A | 2/2013 |
| JP | 2015-023560 A | 2/2015 |
| WO | 2020/196168 A1 | 10/2020 |

* cited by examiner

FIG.6
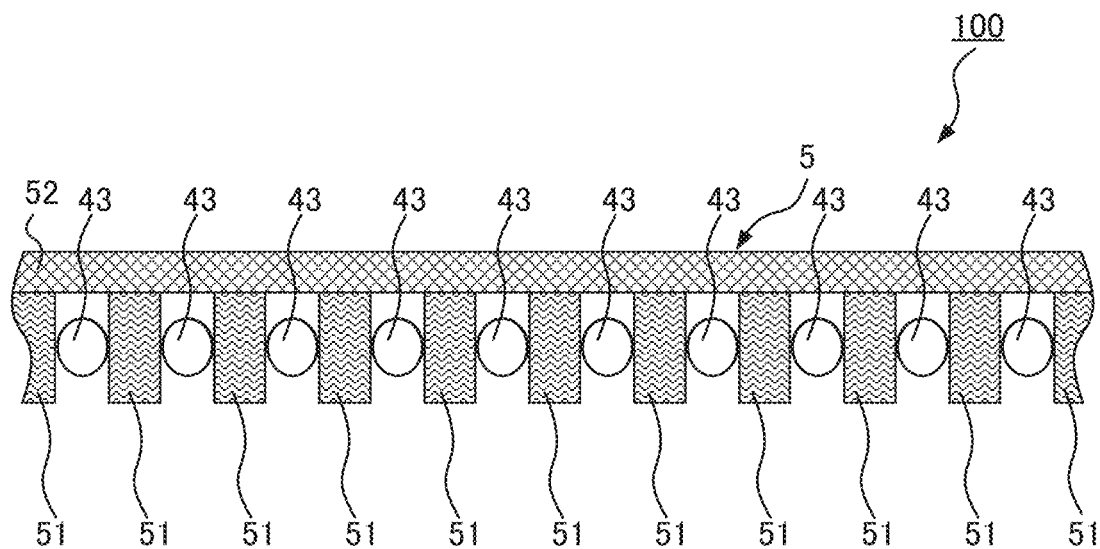
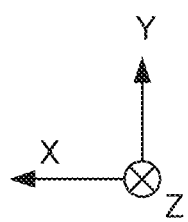

FIG.14
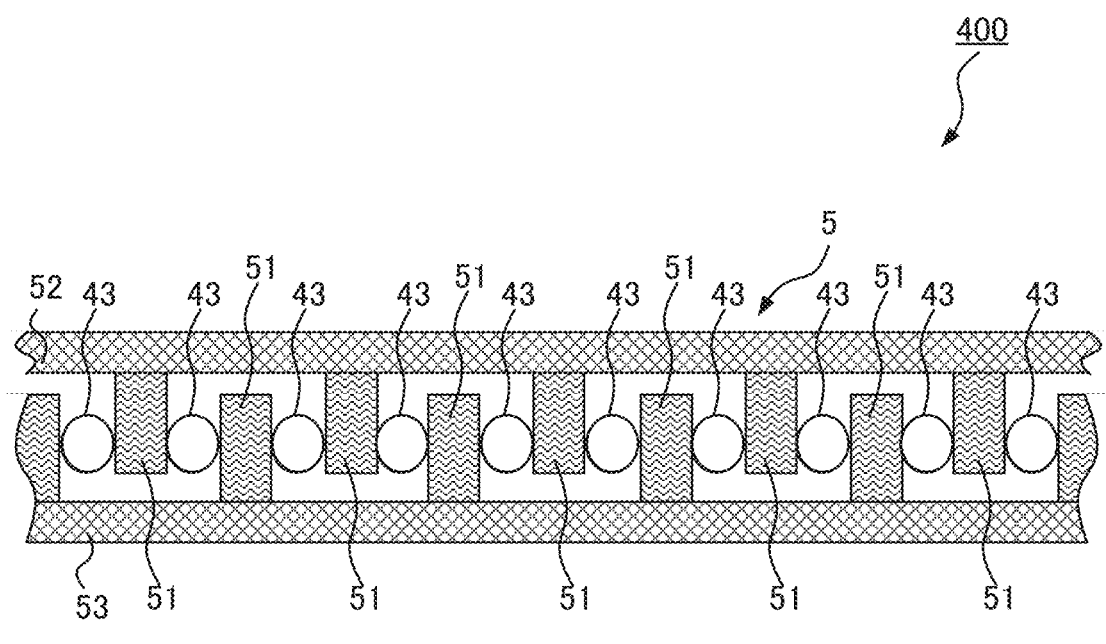
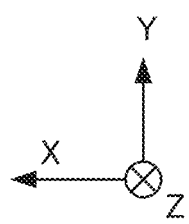

IMAGE READING DEVICE COMPRISING A LENS ARRAY INCLUDING FIRST LENS BODIES AND SECOND LENS BODIES, A LIGHT RECEIVER AND LIGHT BLOCKING PLATES THAT ARE BETWEEN THE LIGHT RECEIVER AND SECOND LENS BODIES, THE THICKNESS OF THE LIGHT BLOCKING PLATES EQUAL TO OR GREATER THAN THE SECOND LENS BODIES THICKNESS

CROSS-REFERENCE TO RELATED APPLICATION

The present application is based on PCT filing PCT/JP2021/045284, filed Dec. 9, 2021, which claims priority from JP 2021-013159, filed Jan. 29, 2021, the entire contents of each are incorporated herein by reference.

TECHNICAL FIELD

The present disclosure relates to an image reading device.

BACKGROUND ART

Image reading devices include a lens array to converge light from a reading target that is a subject to be irradiated with light, and a sensor integrated circuit (IC) to receive light converged by the lens array. The lens array converges penetrating light that is light penetrating the reading target, or reflected light that is light reflected by the reading target. The sensor IC converts the received light into an electrical signal, and generates information on the reading target, for example, data on images, characters, and patterns.

In order to suppress stray light and improve the optical performance, for example, some of the image reading devices include light blocking members for blocking a part of light passing through multiple lenses arranged in an array in the lens array. One of the image reading devices of this type is disclosed in Patent Literature 1. The image reading device disclosed in Patent Literature 1 includes light blocking members having through holes to be located in the front of the respective lenses.

CITATION LIST

Patent Literature

Patent Literature 1: Unexamined Japanese Patent Application Publication No. 2013-037298

SUMMARY OF INVENTION

Technical Problem

To arrange light blocking members as in the image reading device disclosed in Patent Literature 1 for improvement in optical performance in a case of, for example, arranging lenses having a small diameter at small intervals, the through holes of the light blocking members need to be disposed close to each other. The light blocking members having the through holes disposed close to each other cannot be readily fabricated. In an exemplary case where the light blocking members are designed for the lens array in which lenses having a diameter of 0.6 mm are linearly arranged in contact with each other, arranging the through holes of the light blocking members at sufficiently small intervals, for example, intervals of at least 0.1 mm and at most 0.2 mm, to arrange the through holes with a pitch of 0.6 mm, is needed. This structure unfortunately contracts the allowable tolerance range of the light blocking members, and increases the difficulty of the processes of fabricating the light blocking members and the image reading device including the light blocking members.

The present disclosure is made to solve the above problems, and an objective of the present disclosure is to provide an image reading device that can be readily fabricated and has high optical performance.

Solution to Problem

An image reading device according to the present disclosure includes a lens array, a light receiver, and at least one light blocking member. The lens array includes a plurality of first lens bodies arranged in a line in a main scanning direction with predetermined spacing therebetween to converge light from a reading target. The light receiver receives light converged by each of the plurality of first lens bodies. The at least one light blocking member is disposed between the light receiver and an end of the lens array proximate to the reading target at at least one position corresponding to the predetermined spacing in the main scanning direction. The at least one light blocking member blocks light from the reading target propagating between the plurality of first lens bodies, and each of the at least one light blocking member separates optical paths of light converged by ones of the plurality of first lens bodies that are adjacent to each other.

Advantageous Effects of Invention

The image reading device according to the present disclosure can achieve an extended allowable tolerance range of the light blocking member, can be readily fabricated, and has high optical performance.

BRIEF DESCRIPTION OF DRAWINGS

FIG. 6 is a cross-sectional view of the image reading device according to Embodiment 1 taken along the line VI-VI of FIG. 1;

FIG. 14 illustrates a lens array and a light blocker of an image reading device according to Embodiment 4 when viewed from a light receiver.

DESCRIPTION OF EMBODIMENTS

Figure 1:
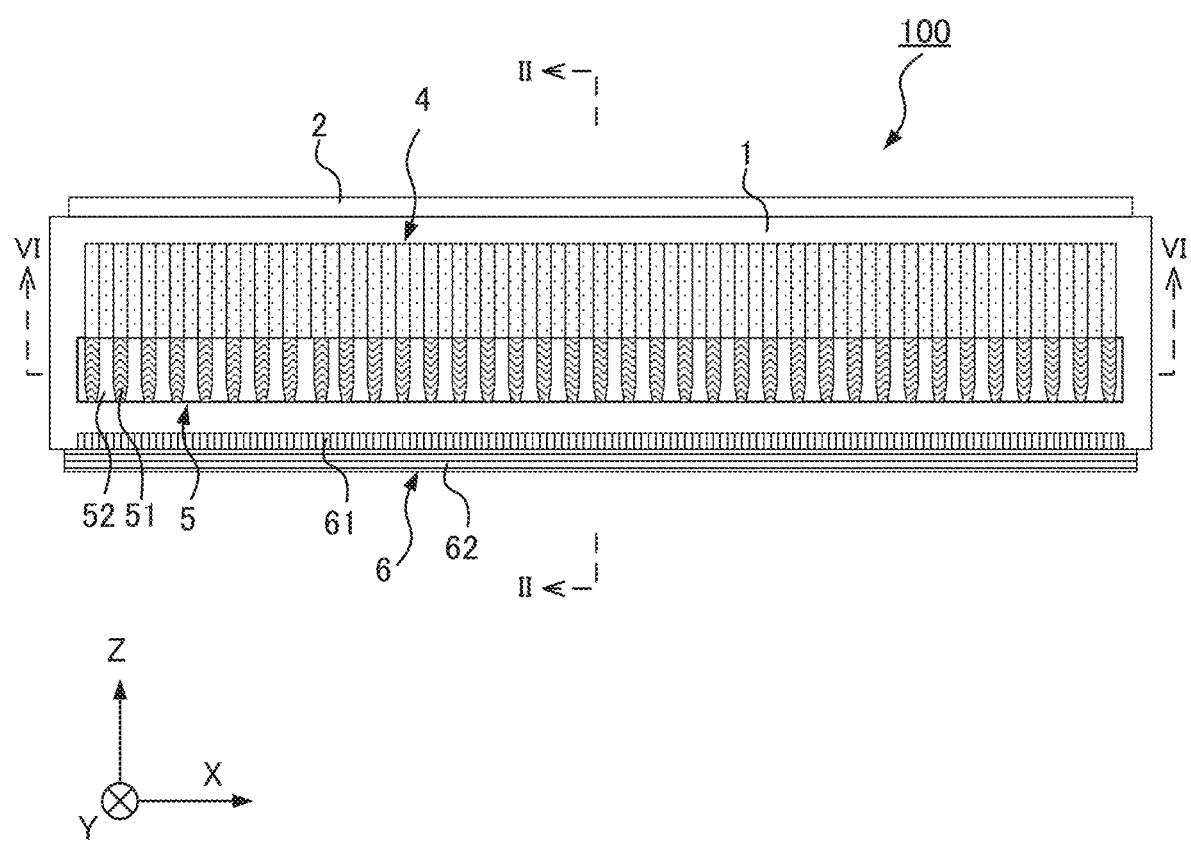
FIG. 1 is a cross-sectional view of an image reading device according to Embodiment 1 in a plane extending in the main scanning direction.

An image reading device according to embodiments of the present disclosure is described in detail below with reference to the accompanying drawings. In the drawings, the components identical or corresponding to each other are provided with the same reference symbol.

Embodiment 1

An image reading device 100 according to Embodiment 1 is described below with reference to the drawings, focusing on an exemplary image reading device to read image data on reading targets, such as bank notes, securities, and other general documents. In the image reading device 100 illustrated in FIG. 1 and FIG. 2 that is a cross-sectional view taken along the line II-II of FIG. 1, the main scanning direction is defined as X axis, the sub-scanning direction is defined as Y axis, and the depth direction of reading is defined as Z axis. FIG. 1 is a cross-sectional view taken along the line I-I of FIG. 2. The main scanning direction and the sub-scanning direction intersect each other, and are preferably orthogonal to each other. In Embodiment 1, the X, Y, and Z axes are orthogonal to each other. The same holds true for the following drawings.

Figure 2:
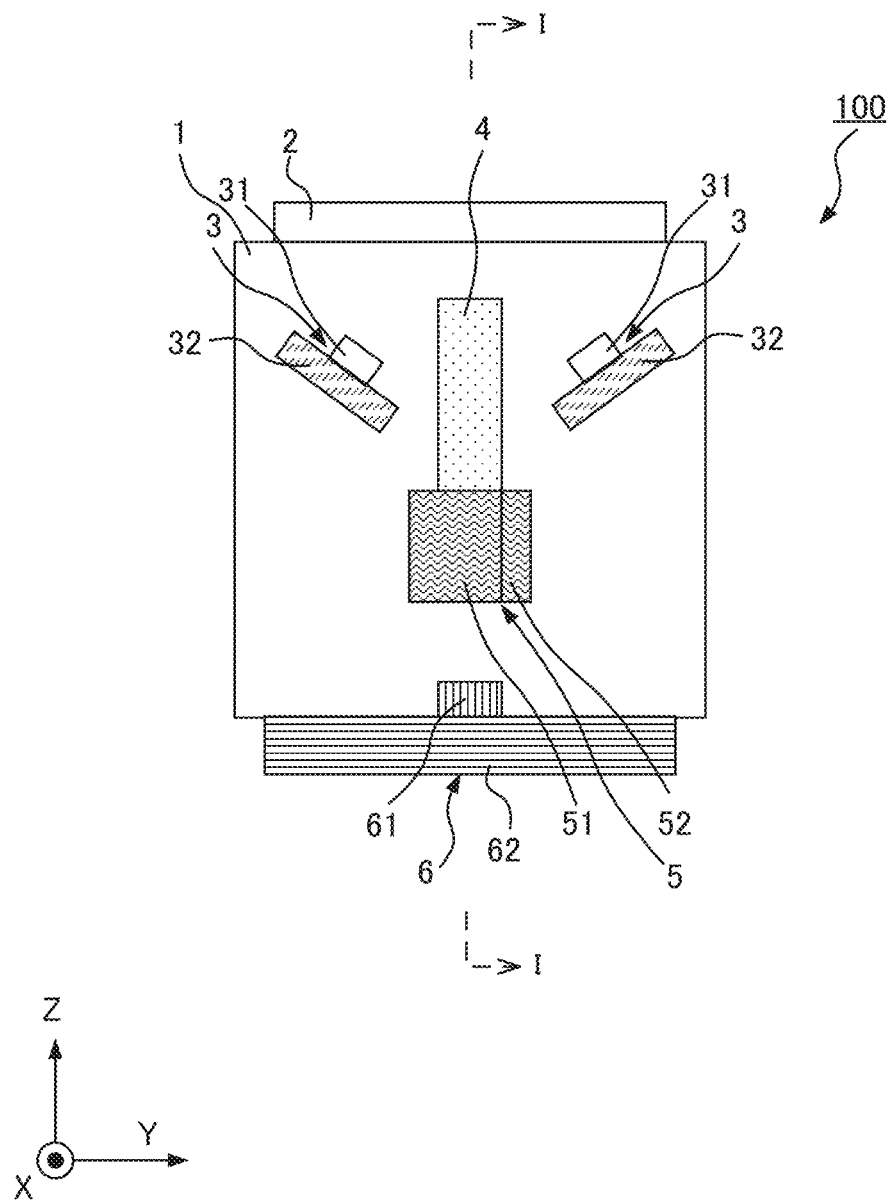
FIG. 2 is a cross-sectional view of the image reading device according to Embodiment 1 taken along the line II-II of FIG. 1.

As illustrated in FIG. 1 that is a cross-sectional view in a plane extending in the main scanning direction of the image reading device 100, and in FIG. 2 that is a cross-sectional view in a plane extending in the sub-scanning direction of the image reading device 100, the image reading device 100 according to Embodiment 1 includes a housing 1 to accommodate some of the components of the image reading device 100, a transparent plate 2 transparent to light to constitute a reading surface for reading image data on a non-illustrated reading target and light sources 3 to irradiate the reading target with light. The image reading device 100 further includes a lens array 4 including multiple first lens bodies to converge light from the reading target, a light blocker 5 including at least one light blocking member each to separate optical paths of light converged by ones of the first lens bodies that are adjacent to each other, and a light receiver 6 to receive light that is converged by the lens array 4 and passes through the light blocker 5.

The housing 1 is a rectangular parallelepiped frame having a rectangular opening that faces the reading target. The longitudinal direction of the housing 1 corresponds to the main scanning direction. The transverse direction of the housing 1 corresponds to the sub-scanning direction, in other words, the transport direction of the reading target. The housing 1 is made of a material for blocking external light, for example, a metal, such as aluminum, or a resin. The housing 1 accommodates the light sources 3, the lens array 4, the light blocker 5, and the light receiver 6, among the above-mentioned components of the image reading device 100. The light sources 3, the lens array 4, the light blocker 5, and the light receiver 6 are directly or indirectly attached to the housing 1 and retained by the housing 1. The housing 1 blocks light incident from the outside of the image reading device 100 to the light receiver 6. The housing 1 also prevents contaminants, such as dust and water drops, from entering the image reading device 100.

The transparent plate 2 is attached to the housing 1 in such an orientation as to close the opening of the housing 1. The transparent plate 2 is made of a material, such as transparent glass or transparent resin, having such a high transmittance that the transparent plate 2 allows the light emitted from the light sources 3 to reach the reading target and allows the light from the reading target to be received at the light receiver 6. The transparent plate 2 has a flat-plate shape in which both surfaces extending in the main scanning direction are flat. The surface of the transparent plate 2 opposite to the surface that faces the housing 1 is the reading surface for the reading target. The reading surface restricts the positions for reading the reading target.

The light sources 3 emit light to the reading target. In Embodiment 1, the light sources 3 are disposed on both sides of the lens array 4 in the sub-scanning direction. Each of the light sources 3 includes light-emitting diodes (LEDs) 31 and an LED substrate 32 extending in the main scanning direction. The LEDs 31 are arranged in an array in the main scanning direction. The LEDs 31 are mounted on the LED substrate 32.

Figure 3:
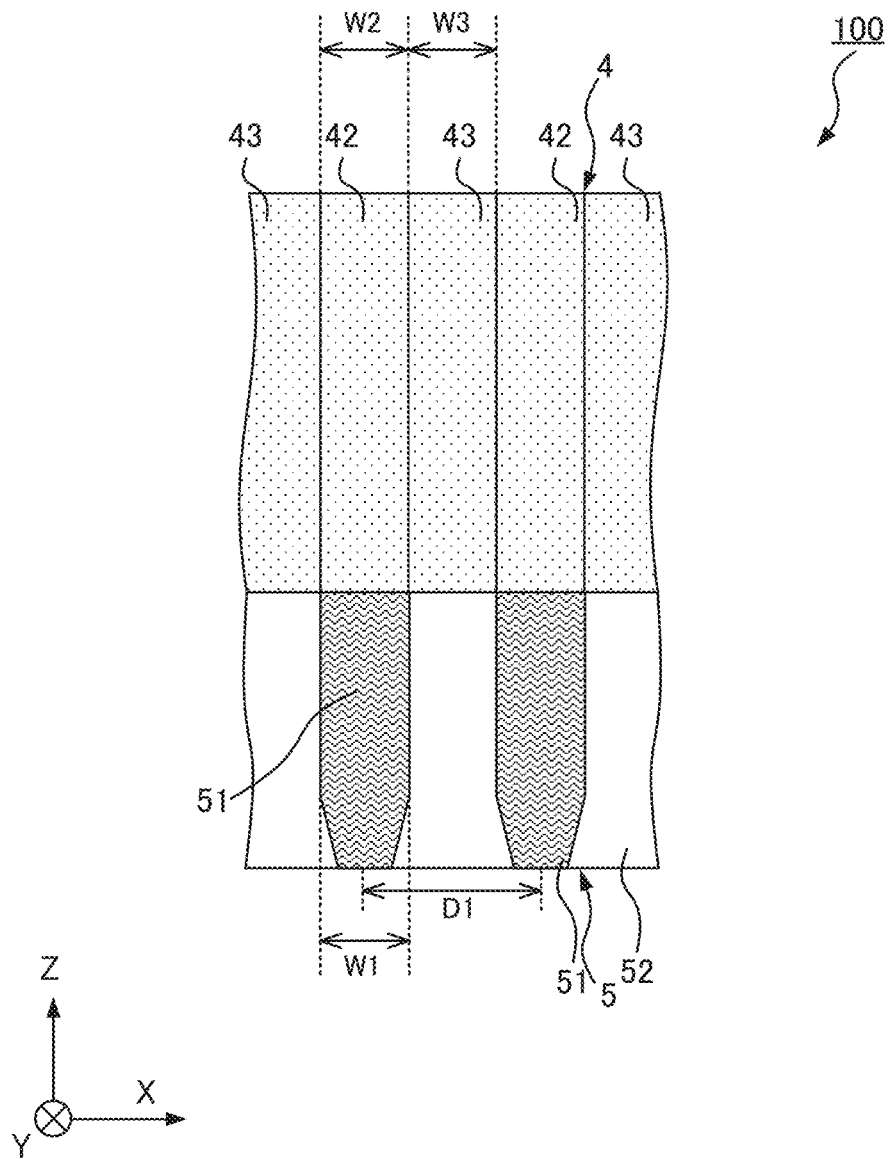
FIG. 3 is a partial cross-sectional view of a lens array and a light blocker of the image reading device according to Embodiment 1 in a plane extending in the main scanning direction.

The lens array 4 includes the first lens bodies located between the reading target and the light receiver 6. The first lens bodies are arranged in a line in the main scanning direction with predetermined spacing therebetween, to converge light from the reading target. As illustrated in FIG. 3, in Embodiment 1, the lens array 4 includes multiple first lens bodies 43 arranged in a line in the main scanning direction with predetermined spacing therebetween, and multiple second lens bodies 42 disposed between the first lens bodies 43. In other words, the first lens bodies 43 and the second lens bodies 42 are alternately arranged in the main scanning direction.

The first lens bodies 43 and the second lens bodies 42 have the same configuration. The optical axis directions of these lens bodies are orthogonal to both of the main scanning direction and the sub-scanning direction. The first lens bodies 43 and the second lens bodies 42 are included in an erecting equal-magnification optical system to converge light from the reading target, for example. The first lens bodies 43 and the second lens bodies 42 are alternately arranged in a line in the main scanning direction with no spaces therebetween. The second lens bodies 42 that are disposed between the first lens bodies 43 and are each in contact with two first lens bodies 43 adjacent to each other across the second lens body 42 suppress displacement of the first lens bodies 43 in the main scanning direction.

The first lens bodies 43 and the second lens bodies 42, arranged as described above, are retained by a non-illustrated retainer. The retainer extends in the main scanning direction, and is provided on both sides of the first lens bodies 43 and the second lens bodies 42 in the sub-scanning direction. The retainer is made of a resin and has a plate shape, for example. The retainer retains the first lens bodies 43 and the second lens bodies 42 on both sides in the sub-scanning direction. The retainer is attached to the housing 1.

The lens array 4 illustrated in FIGS. 1 and 2 is included in an erecting equal-magnification optical system to form an erect unmagnified image of the reading target at the light receiver 6. A typical example of the lens array 4 is a rod lens array. The lens array 4 converges the light that is emitted from the light sources 3, is reflected at the reading target, and then penetrates through the transparent plate 2, or the light that penetrates the reading target and then penetrates through the transparent plate 2, and thus forms an image at the light receiver 6.

For example, a light-receiving surface of the lens array 4 that is a surface facing the reading target and a surface of the retainer for retaining the lens array 4 that faces the reading target are subject to surface polishing and are deemed to be flush with each other. Also, a light-emitting surface of the lens array 4 that is a surface facing the light receiver 6 and a surface of the retainer that faces the light receiver 6 are subject to surface polishing and are deemed to be flush with each other. The surface of the lens array 4 that faces the light receiver 6 is provided with the light blocker 5.

The light receiver 6 receives light converged by the lens array 4. The light receiver 6 includes a sensor substrate 62 attached to the housing 1, a sensor integrated circuit (IC) 61 mounted on the sensor substrate 62, and other components, such as a non-illustrated drive circuit. The sensor IC 61 extends in the main scanning direction so as to correspond to the array of the lens array 4. The sensor IC 61 receives light converged by the lens array 4, converts the light into an electrical signal through photoelectric conversion, and then outputs the electrical signal. The drive circuit generates image data on the reading target from the electrical signal output from the sensor IC 61, and then outputs the image data. The sensor IC 61 is fixed to the sensor substrate 62 with an adhesive, for example.

The sensor substrate 62 is made of a resin, for example, a glass/epoxy composite. The sensor substrate 62 is provided with the sensor IC 61. The optical axes of the first lens bodies 43 or the second lens bodies 42 of the lens array 4 extend through light receiving elements, such as semiconductor chips, installed in the sensor IC 61.

In an optical system including a lens array including multiple lens bodies arranged in a line in contact with each other, the fields of mutually adjoining lens bodies overlap each other and may generate ghosts, resulting in a large aperture angle of the entire lens array and a small depth of field. Such an optical system including a lens array including mutually adjoining lens bodies cannot readily ensure a large depth of field. In order to achieve a large depth of field, the image reading device 100 includes the light blocker 5 between the lens array 4 and the light receiver 6.

Figure 4:
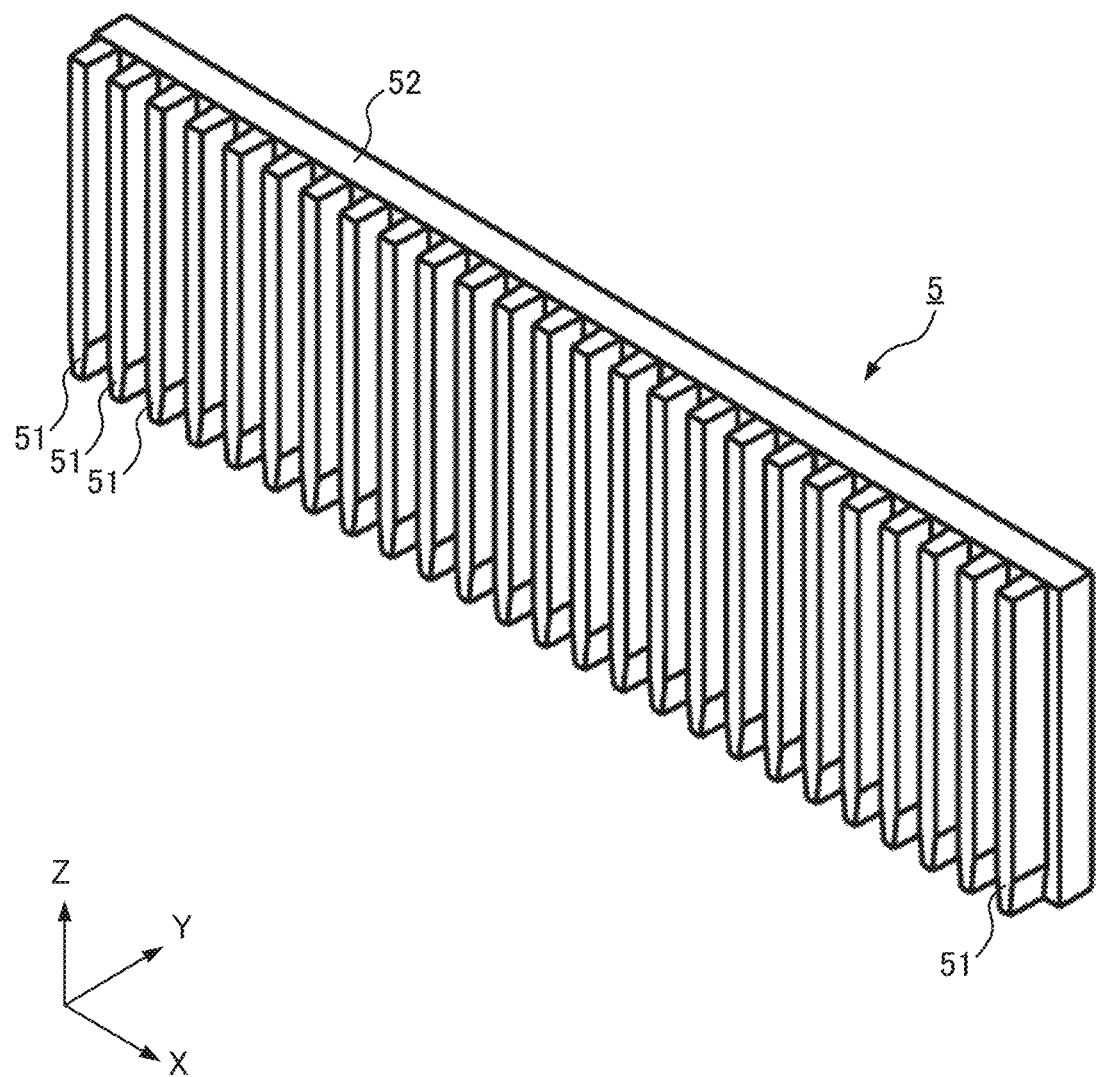
FIG. 4 is a perspective view of the light blocker of the image reading device according to Embodiment 1.

The light blocker 5 is provided to the light-emitting surface of the lens array 4 that is the surface facing the light receiver 6. The light blocker 5 is bonded to the lens array 4 with a less elastic tape or an adhesive, such as silicone adhesive. The light blocker 5 is made of a resin or a metal. The light blocker 5 is fabricated by injection molding or press molding. As illustrated in FIG. 4 that is a perspective view of the light blocker 5, the light blocker 5 includes multiple light blocking members, specifically, multiple light blocking plates 51 to separate optical paths of light converged by the first lens bodies 43 of the lens array 4, and a first lateral plate 52 to which the light blocking plates 51 are attached.

The light blocking plates 51 are disposed between the light receiver 6 and an end of the lens array 4 proximate to the reading target at positions corresponding to the spacing between the first lens bodies 43 in the main scanning direction. Specifically, the light blocking plates 51 are each disposed between mutually adjacent first lens bodies 43 among the lens bodies of the lens array 4 in the main scanning direction, and are more close to the light receiver 6 than the first lens bodies 43. Each of the light blocking plates 51 separates optical paths of light converged by first lens bodies 43 adjacent to each other. In detail, as illustrated in FIG. 3, each of the light blocking plates 51 is disposed between the light receiver 6 and a corresponding second lens body 42 of the second lens bodies 42 that is disposed between first lens bodies 43 adjacent to each other, to separate optical paths of light converged by the first lens bodies 43 adjacent to each other across the corresponding second lens body 42. The separation of optical paths of light converged by first lens bodies 43 adjacent to each other indicates reducing occurrence of a situation in which optical paths of light emitted from the first lens bodies 43 cross each other at any position from the first lens bodies 43 to the light receiver 6.

The light blocking plates 51 are disposed at positions opposed to the respective surfaces of the second lens bodies 42 that face the light receiver 6. The thickness W1 of the light blocking plates 51 in the main scanning direction is equal to or larger than the thickness W2 of the second lens bodies 42 in the main scanning direction that corresponds to the distances between the first lens bodies 43 in the main scanning direction. In other words, the thickness W1 of the light blocking plates 51 in the main scanning direction is equal to or larger than the diameter of the second lens bodies 42. In Embodiment 1, the thickness W1 of the light blocking plates 51 in the main scanning direction is equal to the thickness W2 of the second lens bodies 42 in the main scanning direction.

The light blocking plates 51 are disposed at positions opposed to the respective surfaces of the second lens bodies 42 that face the light receiver 6. Accordingly, a pitch D1 of the light blocking plates 51, in other words, a distance in the main scanning direction between the centers of light blocking plates 51 adjacent to each other is larger than the thickness W3 in the main scanning direction of the first lens bodies 43 that adjoin the second lens bodies 42. The thickness W2 of the second lens bodies 42 in the main scanning direction is equal to the thickness W3 of the first lens bodies 43 in the main scanning direction. Since the thickness W1 of the light blocking plates 51 in the main scanning direction is equal to or larger than the thickness W2 of the second lens bodies 42 in the main scanning direction and the pitch D1 of the light blocking plates 51 is larger than the thickness W3 of the first lens bodies 43 in the main scanning direction, the allowable tolerance range of the light blocker 5 is extended, leading to ready fabrication of the light blocker 5.

The light blocking plates 51 disposed as described above cover the respective surfaces of the second lens bodies 42 that face the light receiver 6. In other words, the light emitted from the second lens bodies 42 is blocked by the light blocking plates 51 and does not reach the light receiver 6. In Embodiment 1, the second lens bodies 42, of which optical paths to the light receiver 6 are blocked by the light blocking plates 51, serve not as lenses but as spacers for suppressing displacement of the first lens bodies 43 in the main scanning direction.

The light emitted from the first lens bodies 43 reaches the light receiver 6, because of no light blocking plates 51 at the positions opposed to the respective surfaces of the first lens bodies 43 that face the light receiver 6. Each of the light blocking plates 51 separates the optical path from one first lens body 43 to the light receiver 6, from the optical path from another first lens body 43 that is adjacent to the one first lens body 43 across a second lens body 42 to the light receiver 6. This structure can reduce overlaps of the fields of lenses, achieve a larger depth of field, and improve the optical performance.

Figure 5:
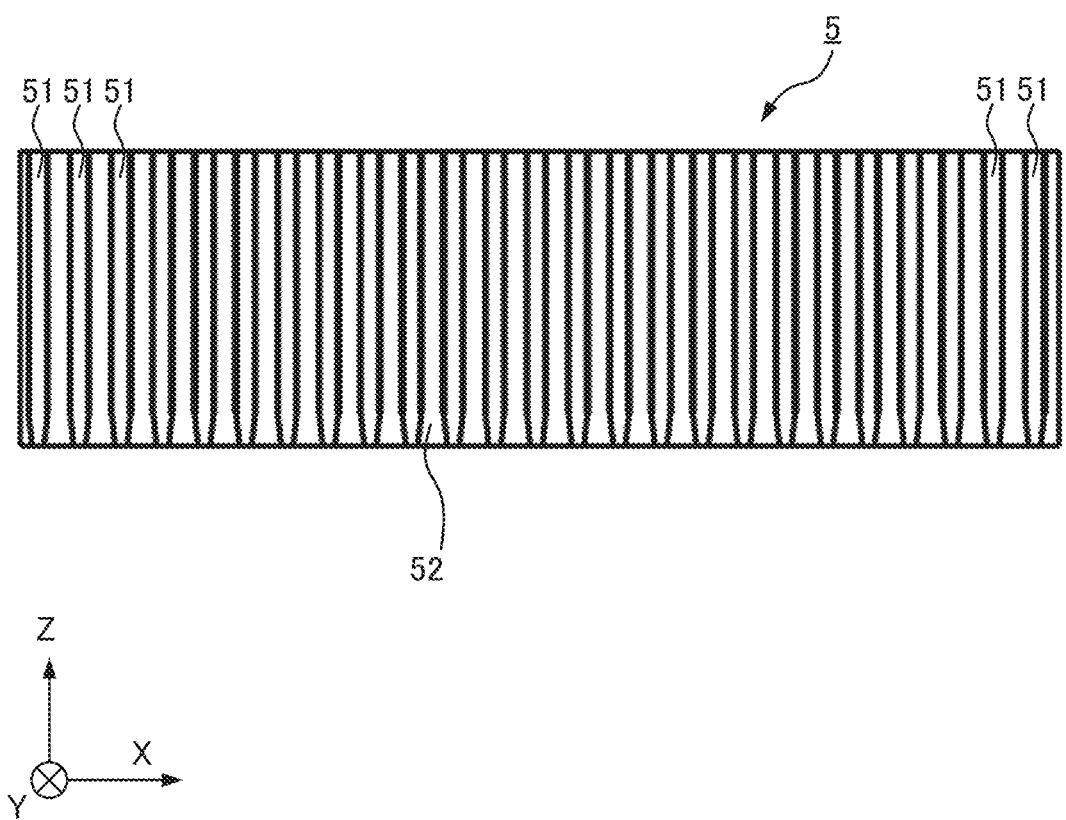
FIG. 5 illustrates the light blocker of the image reading device according to Embodiment 1 when viewed in the sub-scanning direction.

As illustrated in FIG. 4, FIG. 5 illustrating the light blocker 5 when viewed in the sub-scanning direction, and FIG. 6 that is a cross-sectional view taken along the line VI-VI of FIG. 1, the light blocking plates 51 are mounted on the first lateral plate 52 at positions with a certain pitch. The first lateral plate 52 adjoins the light blocking plates 51 in the sub-scanning direction. The first lateral plate 52 is a plate member extending in the main scanning direction. In Embodiment 1, the light blocking plates 51 and the first lateral plate 52 are integrally formed. This structure can reduce the number of components in the light blocker 5, and thereby lowering the costs for fabricating the light blocker 5.

Figure 7:
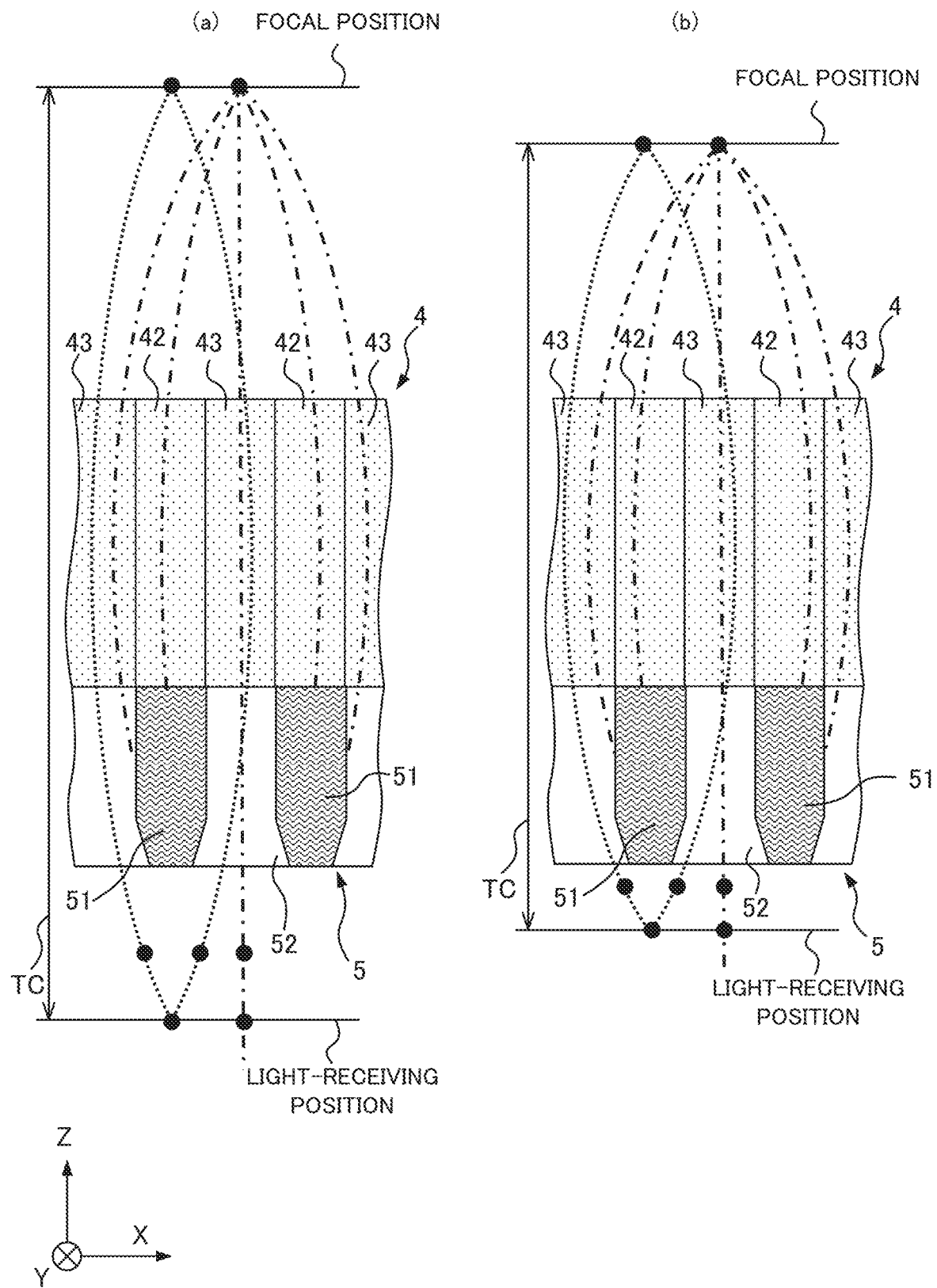
FIG. 7 is a diagram for describing a conjugation length of the lens array of the image reading device according to Embodiment 1, the part (a) is a partial cross-sectional view of the lens array having a long conjugation length and the light blocker in a plane extending in the main scanning direction, and the part (b) is a partial cross-sectional view of the lens array having a short conjugation length and the light blocker in a plane extending in the main scanning direction.

In the image reading device 100 having the above-described structure, the conjugation length TC of the lens array 4 that is the distance between the focal position at which the reading target is to be positioned and the light-receiving position that is the position of the light receiver 6 is preferably determined depending on the depth of field that the image reading device 100 is to have. The parts (a) and (b) of FIG. 7 are partial cross-sectional views of the lens array 4 and the light blocker 5 of the image reading device 100 in a plane extending in the main scanning direction. The conjugation length TC of the lens array 4 illustrated in the part (a) of FIG. 7 is longer than the conjugation length TC of the lens array 4 illustrated in the part (b) of FIG. 7. In the parts (a) and (b) of FIG. 7, the optical paths of light incident to the lens array 4 are represented with the dotted lines and the dashed and single-dotted lines. In accordance with an increase in the depth of field that the image reading device 100 is to have, the conjugation length TC of the lens array 4 is preferably extended from the length illustrated in part (b) of FIG. 7 to the length illustrated in the part (a) of FIG. 7.

Figure 8:
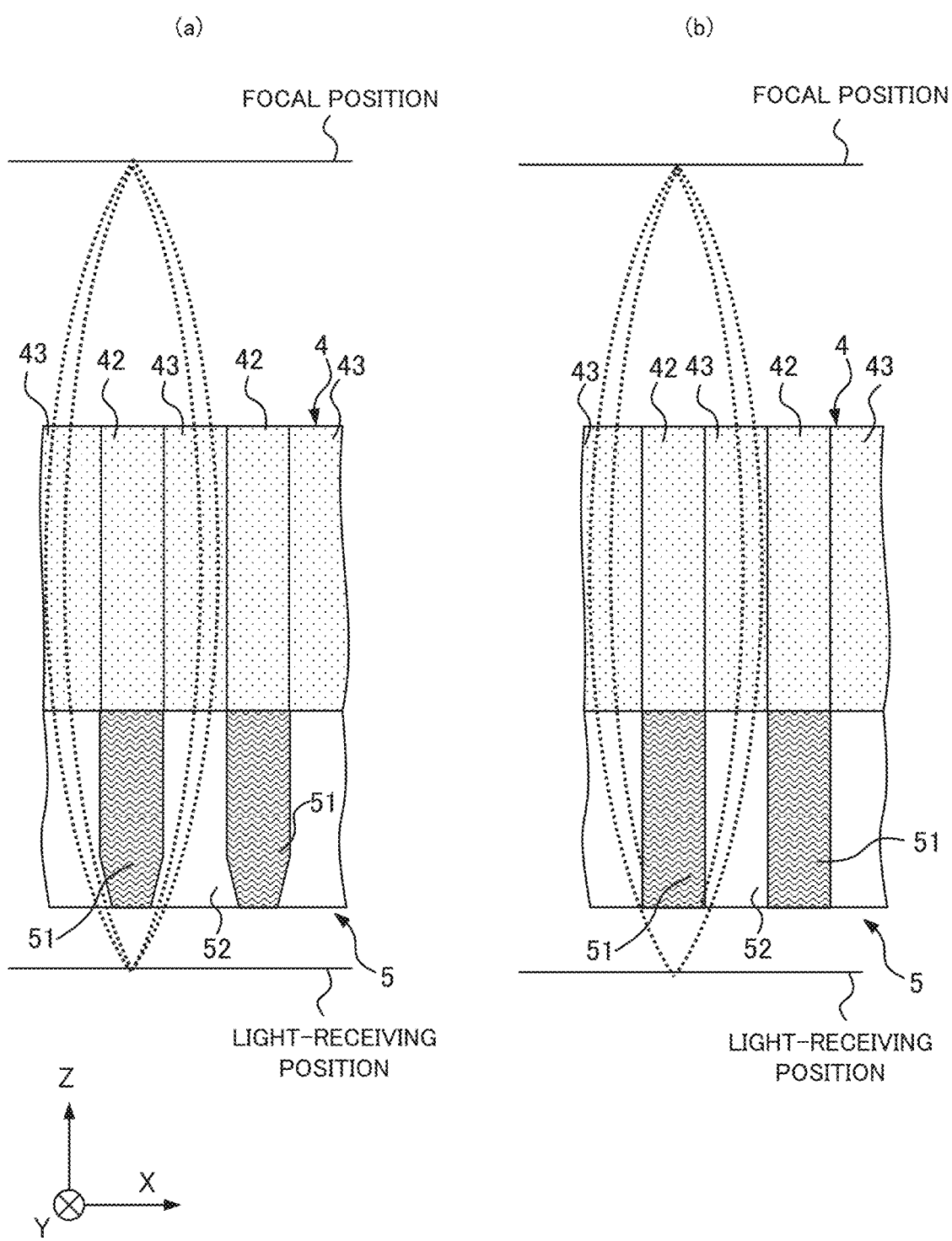
FIG. 8 is a diagram for describing the shape of the ends of light blocking plates included in the image reading device according to Embodiment 1, the part (a) is a partial cross-sectional view of the lens array and the light blocking plates having tapered ends proximate to a light receiver in a plane extending in the main scanning direction, and the part (b) is a partial cross-sectional view of the lens array and the light blocking plates having non-tapered ends proximate to the light receiver in a plane extending in the main scanning direction.

As illustrated in FIG. 3, the light blocking plates 51 preferably have tapered ends proximate to the light receiver 6. In detail, the ends of the light blocking plates 51 proximate to the light receiver 6 preferably have a shape of which the thickness in the main scanning direction decreases toward the light receiver 6. The parts (a) and (b) of FIG. 8 are partial cross-sectional views of the lens array 4 and the light blocker 5 in a plane extending in the main scanning direction. The light blocking plates 51 of the light blocker 5 illustrated in the part (a) of FIG. 8 have tapered ends proximate to the light receiver 6. The light blocking plates 51 of the light blocker 5 illustrated in the part (b) of FIG. 8 have non-tapered ends proximate to the light receiver 6. In the parts (a) and (b) of FIG. 8, the optical paths of light incident to the lens array 4 are represented with the dotted lines.

In the structure illustrated in the part (a) of FIG. 8, the ends of the light blocking plates 51 proximate to the light receiver 6 block a smaller amount of light than that in the structure illustrated in the part (b) of FIG. 8, so that a larger amount of light from the lens array 4 reaches the light receiver 6. As the angle of the tapering in the light blocking plates 51 increases, the amount of light from the lens array 4 reaching the light receiver 6 increases. As the length of the light blocking plates 51 decreases, the amount of light from the lens array 4 reaching the light receiver 6 increases. An increase in the amount of light from the lens array 4 reaching the light receiver 6, however, causes a reduction in the depth of field. The angle of the tapering in the light blocking plates 51 and the length of the light blocking plates 51 are thus preferably determined depending on the light intensity necessary in the light receiver 6 and the depth of field that the image reading device 100 is to have.

Each of the light blocking plates 51 disposed as described above blocks light emitted from the corresponding second lens body 42, and separates the optical paths of light emitted from the first lens bodies 43 adjacent to each other across the second lens body 42. This configuration can therefore improve the optical performance of the image reading device 100. The following description is directed to a structure for further improving the optical performance.

Figure 9:
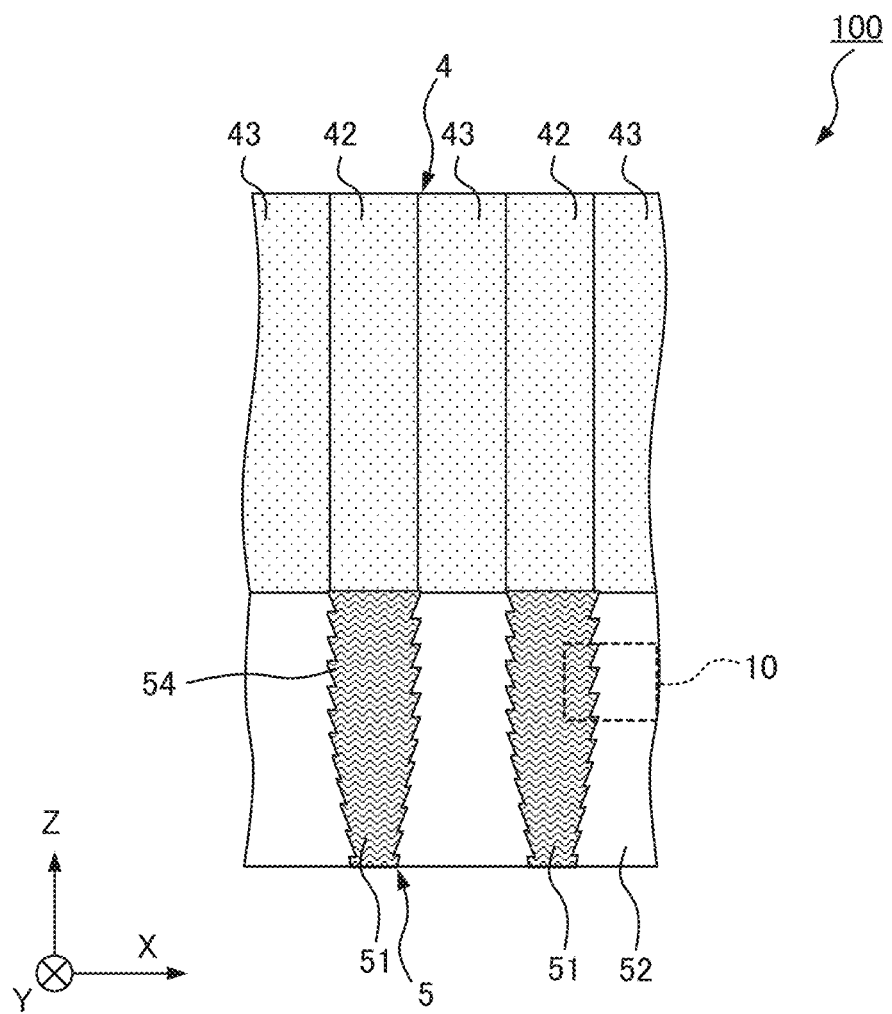
FIG. 9 is a partial cross-sectional view of the lens array and the light blocker of the image reading device according to Embodiment 1 in a plane extending in the main scanning direction.
Figure 10:
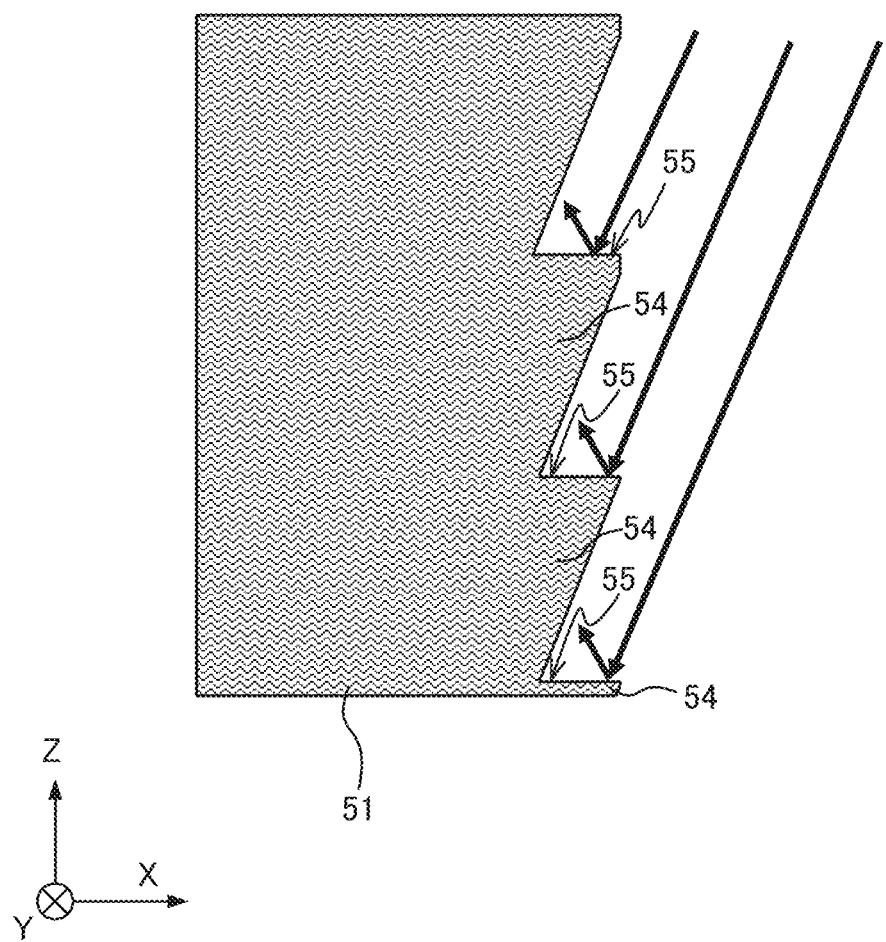
FIG. 10 is an enlarged cross-sectional view of the light blocking plates of the image reading device according to Embodiment 1 in a plane extending in the main scanning direction.

For example, in order to reduce an amount of reflection toward the light receiver 6 of the light incident to the light blocking plates 51, the light blocking plates 51 preferably have reflectors to reflect toward the lens array 4 the light emitted from the lens array 4 and being incident on the surfaces that are continuous to the surfaces of the light blocking plates 51 facing the lens array 4 and that extend in the sub-scanning direction. In detail, each of the light blocking plates 51 preferably has a serrated shape in a section parallel to the XZ plane. As illustrated in FIG. 9 and FIG. 10 that is an enlarged view of a focused area 10 surrounded by the dotted line in FIG. 9, the light blocking plates 51 preferably have multiple teeth 54 arranged in the Z-axis direction. The teeth 54 protrude in the main scanning direction and reflect light toward the lens array 4. Each of the teeth 54 has a shape in which a portion closer to the lens array 4 protrudes further from the light blocking plate 51 than a portion closer to the light receiver 6.

The tooth 54 has a columnar shape extending in the sub-scanning direction and having a bottom surface parallel to the XZ plane, for example. In detail, the tooth 54 has a triangular or rectangular shape in a section parallel to the XZ plane. The tooth 54 has, on one of the side surfaces of the tooth 54, specifically, on the surface that faces the lens array 4, a reflector 55 to reflect light emitted from the lens array 4. For example, the reflector 55 is a surface parallel to the XY plane.

Because of the above-described serrated shape of the light blocking plates 51, the light emitted from the lens array 4 is reflected by the reflectors 55 of the teeth 54, as represented with the solid-line arrows in FIG. 10, and proceeds toward the lens array 4. This structure enables, in comparison to the structure without the teeth 54, a reduction in an amount of reflection, toward the light receiver 6, of light incident on the surfaces of the light blocking plates 51 intersecting the main scanning direction.

For another example, the surfaces of the light blocker 5, in other words, the outer surfaces of the light blocker 5 are preferably colored in black. The black surfaces of the light blocker 5 less cause reflection thereon.

Figure 11:
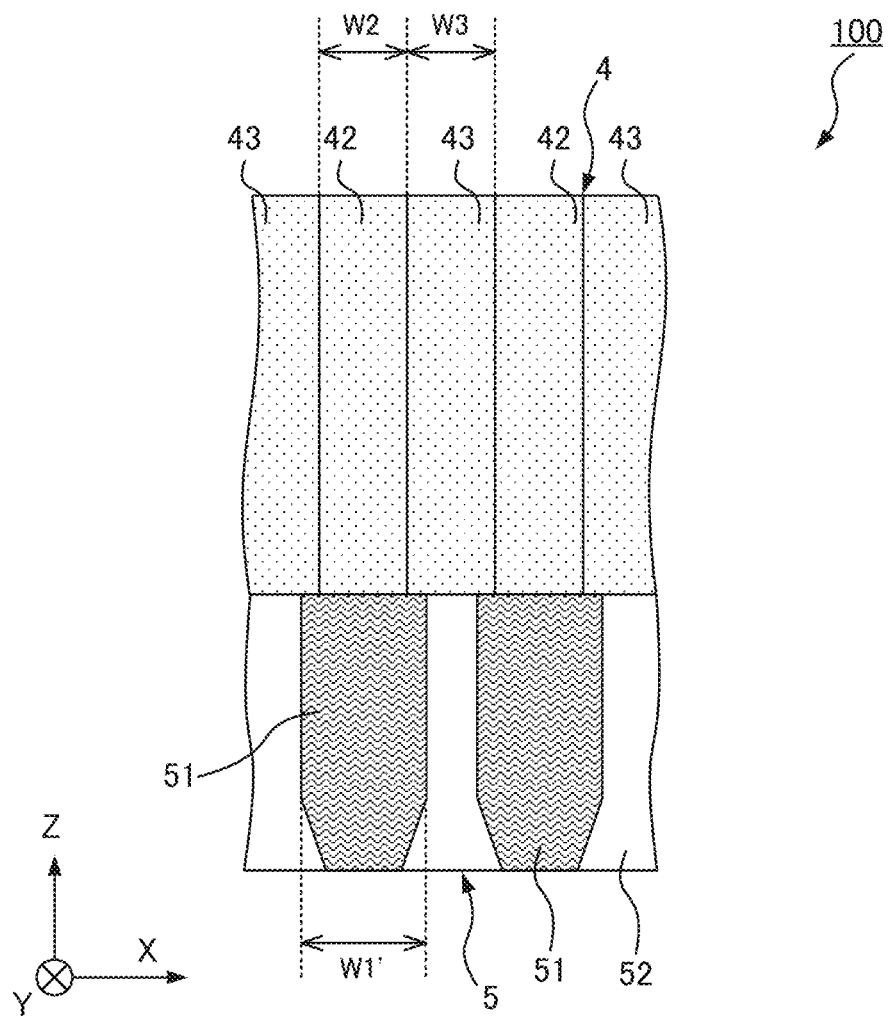
FIG. 11 is a partial cross-sectional view of the lens array and the light blocker of the image reading device according to Embodiment 1 in a plane extending in the main scanning direction.

The following description is directed to a structure for further facilitating fabrication of the image reading device 100. As illustrated in FIG. 11, the thickness W1' of the light blocking plates 51 in the main scanning direction may be larger than the thickness W2 of the second lens bodies 42 in the main scanning direction. In detail, the thickness W1' of the light blocking plates 51 in the main scanning direction is preferably larger than the thickness of the second lens bodies 42 in the main scanning direction and smaller than the double of the thickness W2 of the second lens bodies 42 in the main scanning direction. This structure enables the light blocking plates 51 to block the light from the second lens bodies 42, even in the case when the positions of the light blocking plates 51 relative to the second lens bodies 42 in the main scanning direction are deviated within the range of the half of the difference between the thickness W1' of the light blocking plates 51 in the main scanning direction and the thickness W2 of the second lens bodies 42 in the main scanning direction. That is, the light blocking plates 51 can cover the surfaces of the second lens bodies 42 that face the light receiver 6, regardless of deviation of the positions of the light blocking plates 51 relative to the second lens bodies 42 in the main scanning direction within the above-mentioned range. This structure can mitigate the standard for allowing deviation in assembly of the lens array 4 and the light blocking plates 51, and thereby further facilitating fabrication of the image reading device 100.

As described above, in the image reading device 100 according to Embodiment 1, the first lens bodies 43 and the second lens bodies 42 are alternately arranged in contact with each other, and each of the light blocking plates 51 of the light blocker 5 blocks the light from a second lens body 42 and separates the optical paths of light converged by the first lens bodies 43 adjacent to each other across the second lens body 42. This structure can reduce overlaps of the fields of lenses. The structure can also reduce overlaps of image data acquired at the light receiver 6, because the light passes through a smaller number of lens bodies, specifically, first lens bodies 43 from a certain focal position to the light receiver 6, in comparison to that in an image reading device in which light blocking members are arranged with the pitch equal to the diameter of the lens bodies in contact with each other. The image reading device 100 can thus reduce overlaps of the fields of lenses and overlaps of the acquired images, and can therefore achieve a larger depth of field and improve the optical performance, despite of the lens array 4 including the first lens bodies 43 and the second lens bodies 42 in contact with each other.

The thickness W1 of the light blocking plates 51 of the light blocker 5 in the main scanning direction is equal to or larger than the thickness W2 of the second lens bodies 42 in the main scanning direction. The pitch D1 of the light blocking plates 51 is larger than the thickness W3 of the first lens bodies 43 in the main scanning direction, in other words, the diameter of the first lens bodies 43. This structure can extend the allowable tolerance range of the light blocker 5, leading to ready fabrication of the light blocker 5. The image reading device 100 can therefore be readily fabricated and has high optical performance.

The light blocking plates 51 are arranged with the pitch D1 larger than the diameter of the first lens bodies 43. This structure enables decreasing the probability of occurrence of stacking of liquid for plating or coating between the light blocking plates 51 during plating or coating of the light blocker 5. The light blocking plates 51 can thus be provided with thinner and more uniform plating or coating, in comparison to that in an image reading device in which light blocking members are arranged with the pitch equal to the diameter of the lens bodies in contact with each other.

The light blocking plates 51 having tapered ends proximate to the light receiver 6 allow a larger amount of light from the lens array 4 to reach the light receiver 6. The teeth 54 arranged in the Z-axis direction on the surfaces of the light blocking plates 51 intersecting the main scanning direction enables a reduction in an amount of reflection, toward the light receiver 6, of the light incident on the surfaces of the light blocking plate 51 intersecting the main scanning direction.

Embodiment 2

An image reading device 200 according to Embodiment 2 differs from the image reading device 100 in the structures of the lens array 4 and the light blocker 5. In the following description, a component identical or corresponding to the component described in the above embodiment is provided with the same reference symbol, without redundant description of the component.

Figure 12:
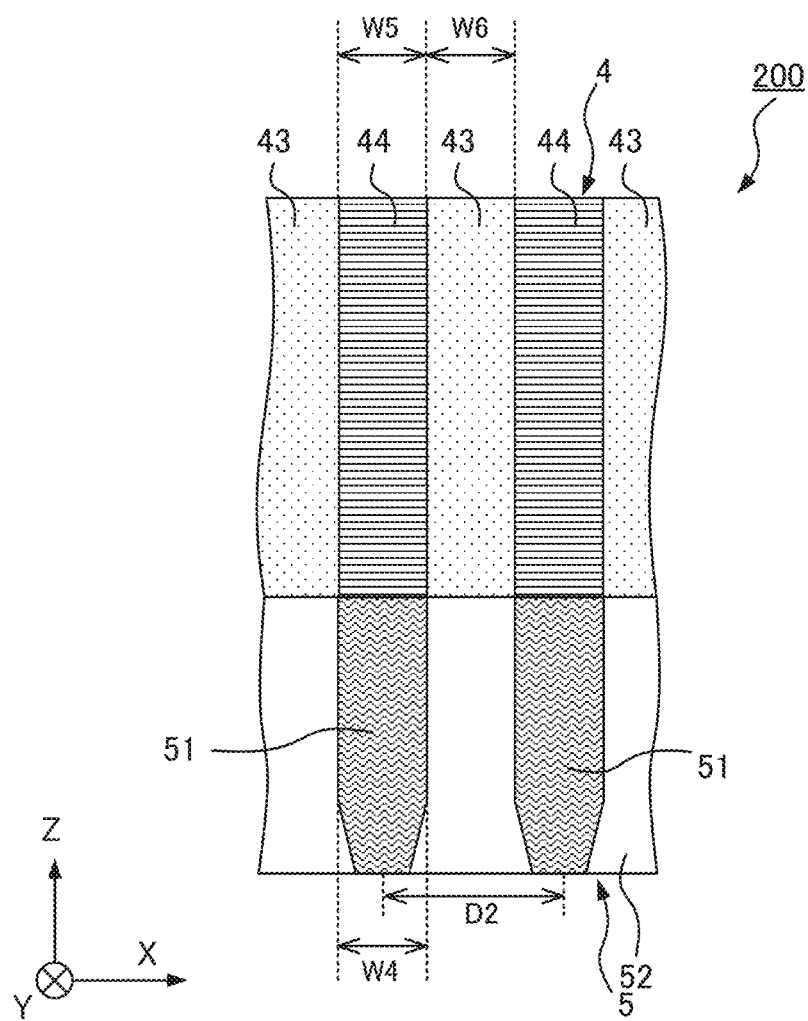
FIG. 12 is a partial cross-sectional view of a lens array and a light blocker of an image reading device according to Embodiment 2 in a plane extending in the main scanning direction.

As illustrated in FIG. 12, the lens array 4 of the image reading device 200 includes multiple first lens bodies 43 arranged in a line in the main scanning direction with predetermined spacing therebetween to converge light from a reading target. The image reading device 200 includes light blocking members disposed between the light receiver 6 and the end of the lens array 4 proximate to the reading target at the positions corresponding to the spacing between the first lens bodies 43 in the main scanning direction. In detail, the image reading device 200 includes, as the light blocking members, multiple light blocking plates 51, and intermediate members 44 disposed between the first lens bodies 43 to block light from the reading target. The first lens bodies 43 and intermediate members 44 are alternately arranged in a line in the main scanning direction in contact with each other with no spaces therebetween. The ends of the first lens bodies 43 proximate to the reading target and the ends of the intermediate members 44 proximate to the reading target are flush with each other.

The optical axis directions of the first lens bodies 43 are orthogonal to both of the main scanning direction and the sub-scanning direction. The first lens bodies 43 are included in an erecting equal-magnification optical system to converge light from the reading target, for example. The first lens bodies 43 and the intermediate members 44 are arranged in a line in the main scanning direction with no spaces therebetween, and retained by the retainer.

The light blocking plates 51 are disposed between the light receiver 6 and the end of the lens array 4 proximate to the reading target. Specifically, the light blocking plates 51 are each disposed at a position between mutually adjacent first lens bodies 43 among the first lens bodies 43 of the lens array 4 in the main scanning direction, and are more close to the light receiver 6 than the first lens bodies 43. Each of the light blocking plates 51 separates the optical paths of light converged by first lens bodies 43 adjacent to each other. In detail, each of the light blocking plates 51 is disposed between the light receiver 6 and a corresponding intermediate member 44 of the intermediate members 44 that is disposed between first lens bodies 43 adjacent to each other, to separate optical paths of light converged by the first lens bodies 43 adjacent to each other across the corresponding intermediate member 44.

The light blocking plates 51 are disposed at the positions opposed to the respective surfaces of the intermediate members 44 that face the light receiver 6. The thickness W4 of the light blocking plates 51 in the main scanning direction is preferably equal to or smaller than the thickness W5 of the intermediate members 44 in the main scanning direction that corresponds to the distances between the first lens bodies 43 in the main scanning direction. For example, the thickness W4 of the light blocking plates 51 in the main scanning direction is equal to the thickness W5 of the intermediate members 44 in the main scanning direction. The light blocking plates 51 thus do not cover the surfaces of the first lens bodies 43 that face the light receiver 6.

The light blocking plates 51 are disposed at the positions opposed to the surfaces of the intermediate members 44 that face the light receiver 6. Accordingly, a pitch D2 of the light blocking plates 51, in other words, a distance in the main scanning direction between the centers of light blocking plates 51 adjacent to each other is larger than the thickness W6 of the first lens bodies 43 in the main scanning direction that adjoin the intermediate members 44. The thickness W5 of the intermediate members 44 in the main scanning direction is equal to the thickness W6 of the first lens bodies 43 in the main scanning direction. Since the thickness W4 of the light blocking plates 51 in the main scanning direction is equal to the thickness W5 of the intermediate members 44 in the main scanning direction and the pitch D2 of the light blocking plates 51 is larger than the thickness W6 of the first lens bodies 43 in the main scanning direction, the allowable tolerance range of the light blocker 5 is extended, leading to ready fabrication of the light blocker 5. The light blocking plates 51 and the intermediate members 44 are included in light blocking members to block light from the reading target propagating between the first lens bodies 43 and separate the optical paths of light converged by mutually adjacent first lens bodies 43.

Each of the light blocking plates 51 separates the optical path from one first lens body 43 to the light receiver 6, from the optical path from another first lens body 43 that is adjacent to the one first lens body 43 across an intermediate member 44, to the light receiver 6. This structure can reduce overlaps of the fields of lenses, achieve a larger depth of field, and improve the optical performance.

As in Embodiment 1, the conjugation length TC of the lens array 4 is preferably determined depending on the depth of field that the image reading device 200 is to have.

In order to allow a larger amount of light to reach the light receiver 6, the light blocking plates 51 preferably have tapered ends proximate to the light receiver 6, as in Embodiment 1.

In order to reduce an amount of reflection toward the light receiver 6 of the light incident to the light blocking plates 51, each of the light blocking plates 51 preferably has a serrated shape in a section parallel to the XZ plane. As in Embodiment 1, the light blocking plates 51 preferably have multiple teeth 54 protruding in the main scanning direction and arranged in the Z-axis direction.

As described above, in the image reading device 200 according to Embodiment 2, the light blocker 5 disposed between the lens array 4 and the light receiver 6 separates the optical paths of light converged by first lens bodies 43 adjacent to each other across each intermediate member 44. This structure can reduce overlaps of the fields of lenses. The structure can also reduce overlaps of image data acquired at the light receiver 6 because the light passes through a smaller number of first lens bodies 43 from a certain focal position to the light receiver 6, in comparison to that in an image reading device in which light blocking members are arranged with the pitch equal to the diameter of the lens bodies in contact with each other. The structure can thus reduce overlaps of the fields of lenses and overlaps of the acquired images, achieve a larger depth of field, and improve the optical performance.

The pitch D2 of the light blocking plates 51 is larger than the thickness W6 of the first lens bodies 43 in the main scanning direction, in other words, the diameter of the first lens bodies 43. This structure can extend the allowable tolerance range of the light blocker 5, leading to ready fabrication of the light blocker 5. The image reading device 200 can therefore be readily fabricated and has high optical performance.

Since the light blocking plates 51 are arranged with the pitch D2 larger than the diameter of the first lens bodies 43, a decrease is achievable in the probability of occurrence of stacking of liquid for plating or coating between the light blocking plates 51 during plating or coating of the light blocker 5. The light blocking plates 51 can thus be provided with thinner and more uniform plating or coating, in comparison to that in an image reading device in which light blocking members are arranged with the pitch equal to the diameter of the lens bodies in contact with each other.

The light blocking plates 51 having tapered ends proximate to the light receiver 6 allow a larger amount of light from the lens array 4 to reach the light receiver 6. The teeth 54 arranged in the Z-axis direction on the surfaces of the light blocking plates 51 intersecting the main scanning direction can reduce an amount of reflection toward the light receiver 6 of the light incident to the light blocking plates 51.

Embodiment 3

An image reading device 300 according to Embodiment 3 differs from the image reading device 100 in the structures of the lens array 4 and the light blocker 5. In the following description, a component identical or corresponding to the components described in the above embodiments is provided with the same reference symbol, without redundant description of the component.

Figure 13:
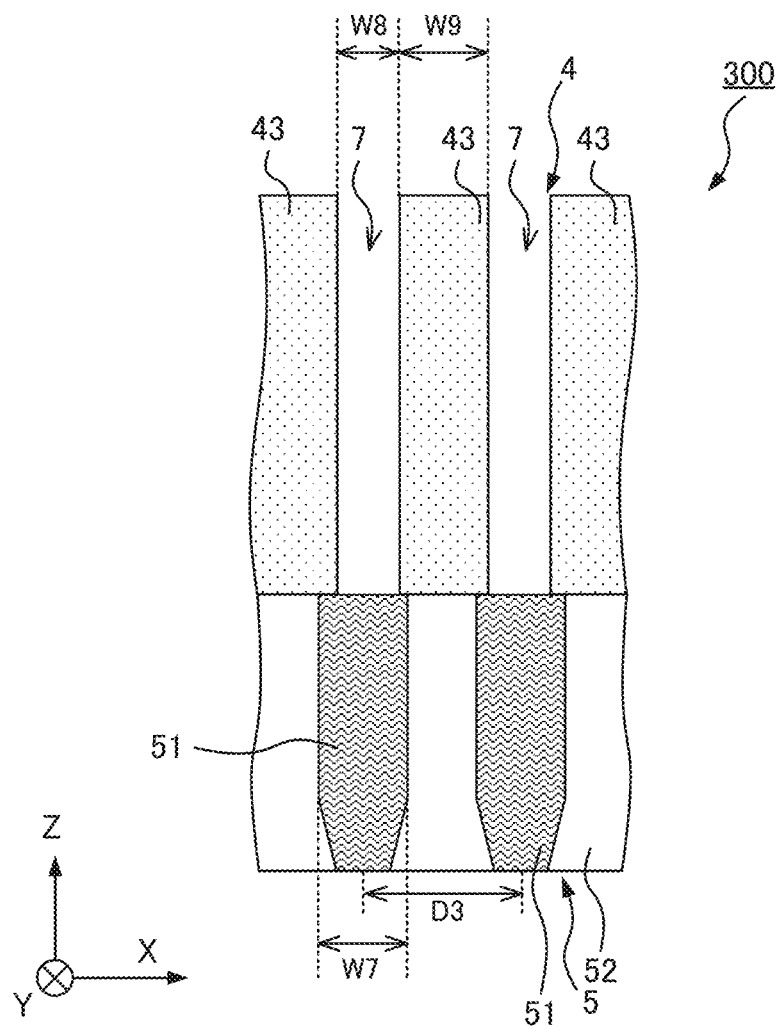
FIG. 13 is a partial cross-sectional view of a lens array and a light blocker of an image reading device according to Embodiment 3 in a plane extending in the main scanning direction.

As illustrated in FIG. 13, the lens array 4 of the image reading device 300 includes multiple first lens bodies 43 arranged in a line in the main scanning direction with predetermined spacing therebetween to converge light from the reading target. The first lens bodies 43 are arranged in a line with voids 7 therebetween.

The optical axis directions of the first lens bodies 43 are orthogonal to both of the main scanning direction and the sub-scanning direction. The first lens bodies 43 are included in an erecting equal-magnification optical system to converge light from the reading target. The first lens bodies 43 are arranged in a line in the main scanning direction with the voids 7 therebetween, and retained by the retainer.

The light blocking plates 51 are each disposed at the position between the light receiver 6 and the voids 7 between mutually adjacent first lens bodies 43 among the first lens bodies 43 of the lens array 4, and separate the optical paths of light converged by the mutually adjacent first lens bodies 43. The Z-axis ends of the light blocking plates 51 are in contact with the Z-axis ends of the first lens bodies 43.

The thickness W7 of the light blocking plates 51 in the main scanning direction is preferably equal to or larger than the width W8 of the voids 7 in the main scanning direction. The light blocking plates 51 thus cover the voids 7 between the first lens bodies 43 on the surface of the lens array 4 that faces the light receiver 6. The light passing through the voids 7 is blocked by the light blocking plates 51 and does not approach the light receiver 6.

The light blocking plates 51 are disposed between the light receiver 6 and the end of the lens array 4 proximate to the reading target at positions corresponding to the respective voids 7. Specifically, the light blocking plates 51 are disposed between the light receiver 6 and the voids 7. Accordingly, a pitch D3 of the light blocking plates 51, in other words, a distance in the main scanning direction between the centers of light blocking plates 51 adjacent to each other, is larger than the thickness W9 of the first lens bodies 43 in the main scanning direction that adjoin the voids 7. Since the thickness W7 of the light blocking plates 51 in the main scanning direction is larger than the width W8 of the voids 7 in the main scanning direction and the pitch D3 of the light blocking plates 51 is larger than the thickness W9 of the first lens bodies 43 in the main scanning direction, the allowable tolerance range of the light blocker 5 is extended, leading to ready fabrication of the light blocker 5.

Each of the light blocking plates 51 separates the optical path from one first lens body 43 to the light receiver 6, from the optical path from another first lens body 43 that is adjacent to the one first lens body 43 across a void 7, to the light receiver 6. This structure can reduce overlaps of the fields of lenses, achieve a larger depth of field, and improve the optical performance.

As in Embodiment 1, the conjugation length TC of the lens array 4 is preferably determined depending on the range of depth of field that the image reading device 300 is to have.

In order to allow a larger amount of light to reach the light receiver 6, the light blocking plates 51 preferably have tapered ends proximate to the light receiver 6, as in Embodiment 1.

In order to reduce an amount of reflection toward the light receiver 6 of the light incident to the light blocking plates 51, each of the light blocking plates 51 preferably has a serrated shape in a section parallel to the XZ plane. As in Embodiment 1, the light blocking plates 51 preferably have multiple teeth 54 protruding in the main scanning direction and arranged in the Z-axis direction.

As described above, in the image reading device 300 according to Embodiment 3, the light blocker 5 disposed between the lens array 4 and the light receiver 6 separates the optical paths of light converged by first lens bodies 43 adjacent to each other across a void 7. This structure can reduce overlaps of the fields of lenses. The structure can also reduce overlaps of image data acquired at the light receiver 6 because the light passes through a smaller number of first lens bodies 43 from a certain focal position to the light receiver 6, in comparison to that in an image reading device in which light blocking members are arranged with the pitch equal to the diameter of the lens bodies in contact with each other. The structure can thus reduce overlaps of the fields of lenses and overlaps of the acquired images, achieve a larger depth of field, improve the optical performance.

The pitch D3 of the light blocking plates 51 is larger than the thickness W9 of the first lens bodies 43 in the main scanning direction, in other words, the diameter of the first lens bodies 43. This structure can extend the allowable tolerance range of the light blocker 5, leading to ready fabrication of the light blocker 5. The image reading device 300 can therefore be readily fabricated and has high optical performance.

Since the light blocking plates 51 are arranged with the pitch D3 larger than the diameter of the first lens bodies 43, a decrease is achievable in the probability of occurrence of stacking of liquid for plating or coating between the light blocking plates 51 during plating or coating of the light blocker 5. The light blocking plates 51 can thus be provided with thinner and more uniform plating or coating, in comparison to that in an image reading device in which light blocking members are arranged with the pitch equal to the diameter of the lens bodies in contact with each other.

The light blocking plates 51 having tapered ends proximate to the light receiver 6 allow a larger amount of light from the lens array 4 to reach the light receiver 6. The teeth 54 arranged in the Z-axis direction on the surfaces of the light blocking plates 51 intersecting the main scanning direction enables a reduction in an amount of reflection, toward the light receiver 6, of the light incident on the surfaces of the light blocking plates 51.

Embodiment 4

An image reading device 400 according to Embodiment 4 differs from the image reading device 100, 200, or 300 in the structure of the light blocker 5. In the following description, a component identical or corresponding to the components described in the above embodiments is provided with the same reference symbol, without redundant description of the component.

As illustrated in FIG. 14, the light blocker 5 of the image reading device 400 includes multiple light blocking plates 51 each to separate the optical paths of light converged by first lens bodies 43 adjacent to each other across a corresponding second lens body 42, a first lateral plate 52 to which some of the light blocking plates 51 are attached, and a second lateral plate 53 provided with others of the light blocking plates 51.

The light blocking plates 51 are arranged with a certain pitch and mounted on the first lateral plate 52 or the second lateral plate 53. In detail, one of two mutually adjacent light blocking plates 51 is mounted on the first lateral plate 52, and the other of the two mutually adjacent light blocking plates 51 is mounted on the second lateral plate 53.

The first lateral plate 52 is a plate member extending in the main scanning direction. The first lateral plate 52 adjoins the light blocking plates 51 in the sub-scanning direction.

The second lateral plate 53 is a plate member extending in the main scanning direction. The second lateral plate 53 is disposed such that the light blocking plates 51 are held between the first lateral plate 52 and the second lateral plate 53 in the sub-scanning direction.

In Embodiment 4, the light blocking plates 51 mounted on the first lateral plate 52 and the first lateral plate 52 are integrally formed as one unit. Also, the light blocking plates 51 mounted on the second lateral plate 53 and the second lateral plate 53 are integrally formed as another unit. These two units are disposed such that the light blocking plates 51 of the respective units face each other, so that the light blocking plates 51 mounted on the first lateral plate 52 and the light blocking plates 51 mounted on the second lateral plate 53 are alternately arranged in the main scanning direction.

As described above, one of two mutually adjacent light blocking plates 51 is mounted on the first lateral plate 52, and the other of the two mutually adjacent light blocking plates 51 is mounted on the second lateral plate 53. Accordingly, the pitch of the light blocking plates 51 mounted on the first lateral plate 52 and the pitch of the light blocking plates 51 mounted on the second lateral plate 53 in the image reading device 400 are larger than the pitch of the light blocking plates 51 in the structure in which all the light blocking plates 51 are mounted on the first lateral plate 52. Because of the larger pitches of the light blocking plates 51 to be integrally formed, the light blocker 5 can be more readily fabricated in comparison to the light blocker 5 in any of Embodiments 1 to 3.

As described above, in the image reading device 400 according to Embodiment 4, the light blocker 5 disposed between the lens array 4 and the light receiver 6 separates the optical paths of light converged by first lens bodies 43 adjacent to each other across each second lens body 42. This structure can reduce overlaps of the fields of lenses. The structure can also reduce overlaps of image data acquired at the light receiver 6 because the light passes through a smaller number of lens bodies, specifically, first lens bodies 43 from a certain focal position to the light receiver 6, in comparison to that in an image reading device in which light blocking members are arranged with the pitch equal to the diameter of the lens bodies in contact with each other. The structure can thus reduce overlaps of the fields of lenses and overlaps of the acquired images, achieve a larger depth of field, and improve the optical performance.

The pitch of the light blocking plates 51 mounted on the first lateral plate 52 and the pitch of the light blocking plates 51 mounted on the second lateral plate 53 are larger than the pitch in the structure in which all the light blocking plates 51 are mounted on the first lateral plate 52 as in Embodiment 1. This structure can contribute to ready fabrication of the light blocker 5. The image reading device 400 can therefore be readily fabricated and has high optical performance.

Because of the pitch of the light blocking plates 51 larger than that in Embodiment 1, a decrease is achievable in the probability of occurrence of stacking of liquid for plating or coating between the light blocking plates 51 during plating or coating of the light blocker 5. The light blocking plates 51 can thus be provided with much thinner and more uniform plating or coating than that in Embodiment 1.

The above-described embodiments are not intended to limit the scope of the present disclosure. Some of the above-described embodiments may be combined with each other. For example, the image reading device 200 or 300 may include the light blocker 5 having the same structure as that of the image reading device 400. For another example, among the voids 7 between the first lens bodies 43 of the lens array 4 of the image reading device 300, some of the voids 7 may be provided with the intermediate members 44 while the other voids 7 may lack the intermediate members 44.

The above-described lens array 4 is a mere example and may be replaced with any other lens array provided that the lens array converges light from the reading target. For example, the lens array 4 may be a microlens array.

The above-described light blocking members provided to the lens array 4 are mere examples and may be replaced with columnar light blocking members.

The light blocking plates 51 that are examples of the light blocking members do not necessarily have the above-described shape. The light blocking plates 51 may also have non-tapered ends proximate to the light receiver 6, as illustrated in the part (b) of FIG. 8. The light blocking plates 51 may have the identical thickness or different thicknesses in the main scanning direction.

In order to reduce an amount of reflection toward the light receiver 6 of the light incident to the light blocking plates 51, the light blocker 5 may have uneven surfaces. For example, the surfaces of the light blocker 5 may be covered with a coating material containing granular or fibrous fillers. A typical example of the fillers is carbon nanotubes. The coating material containing granular or fibrous fillers makes the surfaces of the light blocker 5 uneven. The resulting uneven surfaces can reduce an amount of reflection, toward the light receiver 6, of the light incident to the light blocking plates 51.

For another example, the uneven surfaces of the light blocking plates 51 may be provided through an etching process. In order to make the surfaces sufficiently uneven, the light blocker 5 is preferably made of a resin containing carbon fillers. The etching process involves dissolving the surfaces of the light blocker 5 with an alkaline solution and thereby exposing the carbon fillers on the surfaces of the light blocker 5, for example. This process can thus make the surfaces of the light blocker 5 uneven. The resulting uneven surfaces can reduce an amount of reflection toward the light receiver 6 of the light incident to the light blocking plates 51.

The thickness W4 in the main scanning direction of the light blocking plates 51 provided to the lens array 4 of the image reading device 200 may be larger than the thickness W5 of the intermediate members 44 in the main scanning direction.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2021-13159, filed on Jan. 29, 2021, the entire disclosure of which is incorporated by reference herein.

REFERENCE SIGNS LIST

1 Housing
2 Transparent plate
3 Light source
31 LED
32 LED substrate
4 Lens array
42 Second lens body
43 First lens body
44 Intermediate member (light blocking member)
5 Light blocker
51 Light blocking plate (light blocking member)
52 First lateral plate
53 Second lateral plate
54 Tooth
55 Reflector
6 Light receiver
61 Sensor IC
62 Sensor substrate
7 Void
10 Focused area
100, 200, 300, 400 Image reading device
D1, D2, D3 Pitch TC Conjugation length
W1, W2, W3, W4, W5, W6, W7, W9 Thickness
W8 Width

The invention claimed is:

1. An image reading device, comprising:
a lens array including
   a plurality of first lens bodies arranged in a line in a main scanning direction with predetermined spacing therebetween to converge light from a reading target, and
   a plurality of second lens bodies disposed between the plurality of first lens bodies;
a light receiver to receive light converged by each of the plurality of first lens bodies; and
a plurality of light blocking plates disposed at positions between the light receiver and the plurality of second lens bodies so as to be disposed at positions corresponding to the predetermined spacing in the main scanning direction, the plurality of light blocking plates member being configured to block light from the reading target propagating through the plurality of second lens bodies and each being configured to separate optical paths of light converged by ones of the plurality of first lens bodies, the ones of the plurality of first lens bodies being adjacent to each other across a corresponding second lens body of the plurality of second lens bodies, wherein
a pitch of the plurality of light blocking plates in the main scanning direction is larger than a thickness of each of the plurality of first lens bodies in the main scanning direction, and
each of the plurality of light blocking plates has a thickness in the main scanning direction equal to or larger than a thickness of each of the plurality of second lens bodies in the main scanning direction.

2. The image reading device according to claim 1, further comprising:
a first lateral plate to which at least one of the plurality of light blocking plates is attached in a sub-scanning direction intersecting the main scanning direction.

3. The image reading device according to claim 2, further comprising:
a second lateral plate to which at least one of the plurality of light blocking plates members is attached, the second lateral plate being disposed such that the plurality of light blocking plates are located between the first lateral plate and the second lateral plate in the sub-scanning direction.

4. The image reading device according to claim 1, wherein each of the plurality of light blocking plates includes a reflector to reflect, toward the lens array, light emitted from the lens array and being incident on a surface that is continuous to a surface of the light blocking plate facing the lens array and that extends in a sub-scanning direction intersecting the main scanning direction.

5. The image reading device according to claim 4, wherein the plurality of light blocking plates has a serrated shape in which the reflector is formed on a surface facing the lens array.

6. The image reading device according to claim 1, wherein the plurality of first lens bodies are included in an erecting equal-magnification optical system.

\* \* \* \* \*